April 10, 1928. 1,665,857
J. C. NEEDHAM
ELECTRICAL TRANSMISSION SYSTEM
Filed May 26, 1920   3 Sheets-Sheet 1

INVENTOR:
John C. Needham
By Wm Wallace White
ATTY.

April 10, 1928.

J. C. NEEDHAM 1,665,857

ELECTRICAL TRANSMISSION SYSTEM

Filed May 26, 1920

INVENTOR:
John C. Needham
By Wm Wallace White
ATTY.

April 10, 1928.                                                         1,665,857
J. C. NEEDHAM
ELECTRICAL TRANSMISSION SYSTEM
Filed May 26, 1920           3 Sheets-Sheet 3

INVENTOR:
John C. Needham
By Wm Wallace White
ATTY.

Patented Apr. 10, 1928.

1,665,857

UNITED STATES PATENT OFFICE.

JOHN CUTHBERT NEEDHAM, OF LONDON, ENGLAND, ASSIGNOR TO EVERSHED & VIGNOLES LIMITED AND HIMSELF, BOTH OF LONDON, ENGLAND.

ELECTRICAL TRANSMISSION SYSTEM.

Application filed May 26, 1920, Serial No. 384,462, and in Great Britain July 10, 1919.

The invention relates to improvements in electrical transmission systems by means of which the speed of a moving body can be readily ascertained from a distance or variations in speed can be employed to transmit orders.

The invention has for its objects the provision of simple means whereby the speed of a moving body can be ascertained with great certainty, accuracy and efficiency without risk of derangement.

This invention may be carried into effect in many ways, of which the following may be considered as examples only.

Referring to the drawings, which form part of this specification,

Figure 9:
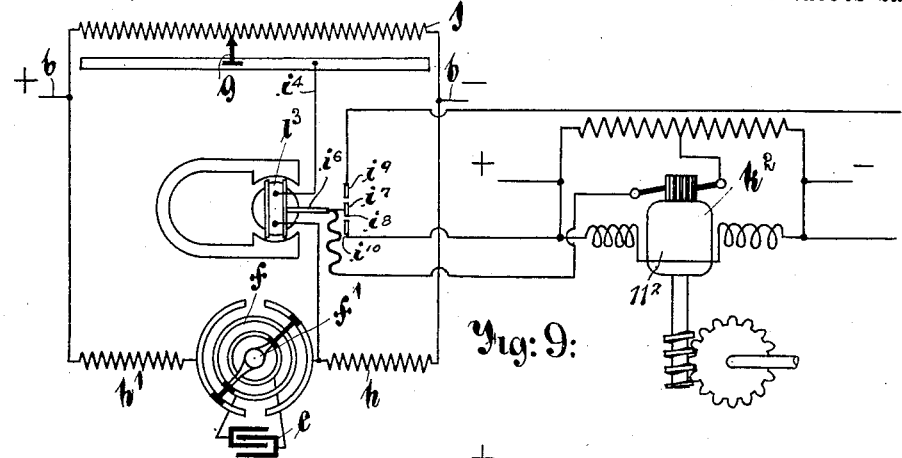

Fig. 9 diagrammatically illustrates an arrangement for speed control.

Figure 10:
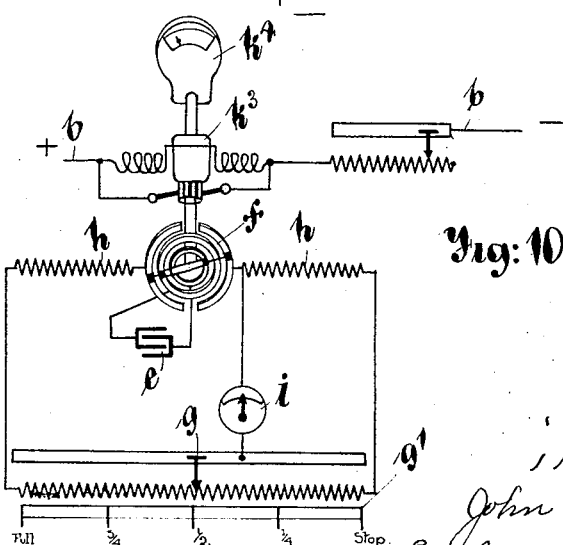

Fig. 10 diagrammatically illustrates an arrangement for transmission of messages.

Figure 11:
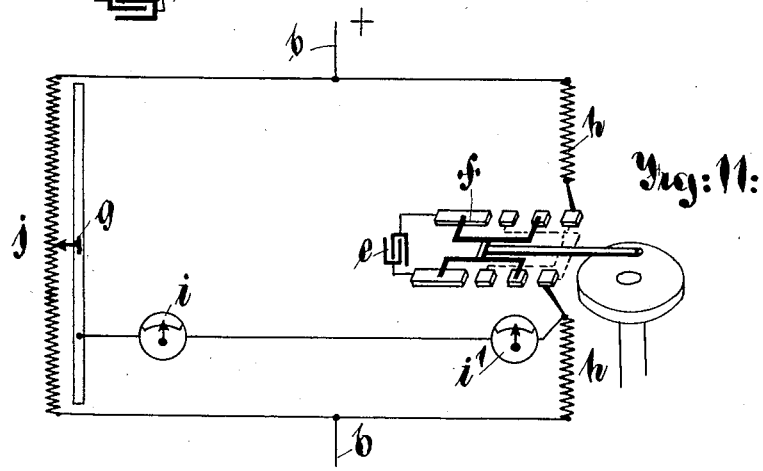

Fig. 11 diagrammatically illustrates a method of carrying the invention into effect when associated with reciprocatory motion.

Figure 1:
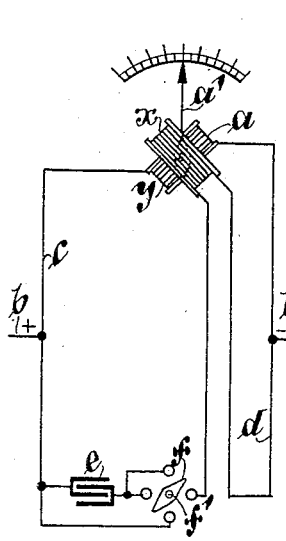
Fig. 1 illustrates diagrammatically one arrangement by which the invention can be simply carried into effect for indicating speed.

Referring to the drawings, Figure 1 diagrammatically illustrates a simple arrangement for the indication of speed, $a$ being an instrument having ratio coils for the measurement of electrical resistances said instrument $a$ being associated with a source of electrical energy through the conductors $b\ b$. In such an instrument the deflection of the pointer $a'$ depends upon the ratio of the currents flowing through the two coils $x$ and $y$ which are set at an angle to one another and are electrically connected in parallel with each other. A condenser $e$ of constant capacity and an interrupter $f$ are inserted in the circuit including the coil $x$, the interrupter $f$ being adapted to allow the condenser $e$ to be alternately charged and discharged. The current in coil $x$ depends upon the number of times per second the condenser is charged by the completion of its circuit through the interrupter $f$ the discharge not passing through the coil $x$. The deflection of the pointer $a'$ consequent upon rotation of the interrupter $f$ will therefore indicate the speed at which the interrupter $f$ and its shaft $f'$ are being rotated.

Figure 2:
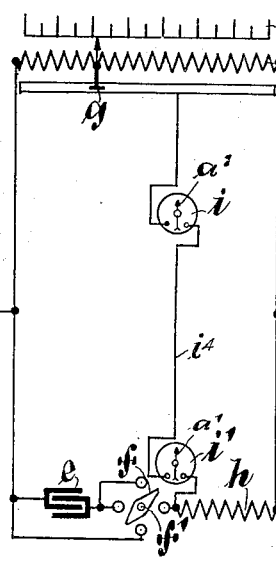
Fig. 2 illustrates diagrammatically a second arrangement by which the invention can be carried into effect as a tell tale telegraph.

When the system is to be used as a tell tale telegraph and speed measuring device the parts are arranged as illustrated in Fig. 2. This arrangement is based on the principle of the Wheatstone bridge which it somewhat resembles. The transmitting or measuring instrument is formed by two arms of the bridge arrangement, the ratio of which is alterable by means of a sliding contactor $g$, an interrupter $f$ adapted to be connected to the moving body and electrically connected in series with a condenser $e$ of constant capacity, forms the third arm and a resistance $h$ forms the fourth. Two indicators $i\ i'$ in series, are arranged in the mid wire $i^4$, and a suitable source of electrical energy is supplied through the circuits $b\ b$. The indicator $i$ is placed at the transmitting station and the indicator $i'$ in proximity with the moving body. In use to transmit an order for a change of speed the operator moves the contactor $g$ to the appropriate position on a scale of speed $g'$, which corresponds with a suitable ratio of resistance, this variation in ratio disturbs the balance of the bridge arrangement and the pointers $a'$ of the indicators $i\ i'$ will give an indication of the current flowing in the mid wire $i^4$. To restore the pointers $a$ to zero position an appropriate change in the speed at which the interrupter $f$ is moved must be made, so that the operator in charge is aware when his order has been obeyed. If the system is to be used as a device for measuring speed only, the indicating instrument $i'$ in proximity with the moving body can be omitted. With such a modified arrangement the speed is ascertained by moving the contactor $g$ on the scale of speed $g'$ until the pointer $a'$ of the indicator $i$ is at zero.

Figure 3:
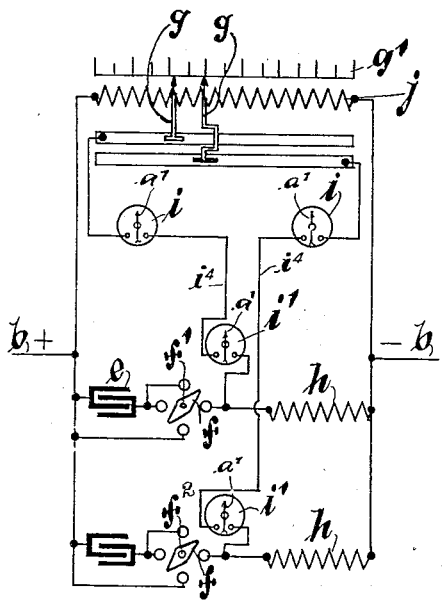
Fig. 3 illustrates diagrammatically an amplification of the arrangement shown in Fig. 2.

By a suitable disposition of parts and duplication of apparatus the above arrangement may be used to enable orders to be conveyed to two or more sets of apparatus and the speed of them may also be measured at the control position. Fig. 3 illustrates diagrammatically how this can be effected for two sets of apparatus. In this instance two interrupters $f$ are employed one being mounted on a shaft $f'$ and the other on a shaft $f^2$. These interrupters are associated with two condensers $e\ e$ of constant capacity and two resistances $h\ h$. At the transmitting station two contactors $g\ g$ are arranged to divide the resistance $j$ as required. It will be seen that these devices are connected so as to form in effect and to function as two Wheatstone bridges, two indicators $i$ and $i'$ being arranged in each circuit to show want of balance in that circuit. When a change of speed of one set of apparatus is required, the operator in charge moves the appropriate contactor $g$ to the position corresponding to the desired speed, and the speed of the associated interrupter $f$ must be altered to restore the pointer $a'$ of the associated indicator to zero. When all orders so transmitted have been obeyed, all the indicators will be balanced; and the interference in the balance of one transmission made by signalling an order on the other before that order has been obeyed may be practically eliminated by suitably reducing the resistance of the bridge arms. It will be observed that this device will enable any desired difference of speeds to be maintained, the two contactors $g\ g$ being fixed at requisite distance apart, although movable relatively to the resistance $j$. This arrangement also provides a convenient way of measuring difference of speed, a suitable scale being mounted on one contactor $g$ and a pointer on the other contactor $g$.

Figure 4:
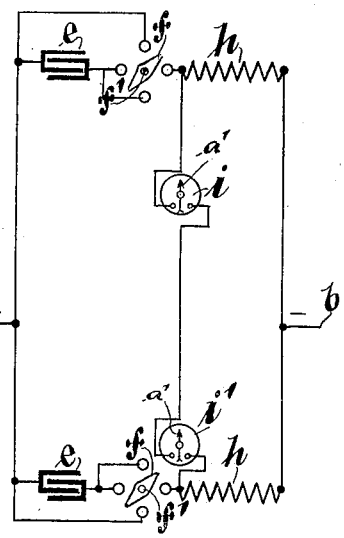
Fig. 4 illustrates diagrammatically an arrangement suitable for indicating synchronization of speed in two devices.

When it is necessary to enable an indication to be effected when the speeds of two appliances at any distance apart have a desired relation the arrangement illustrated in Fig. 4 may be employed. In this case the bridge is arranged so that it is balanced when the two interrupters $f\ f$ are going at the same speed, or at a given ratio of speeds, by suitably proportioning the condensers $e\ e$ and the resistances $h\ h$ either individually or together.

Figures 5, 6:
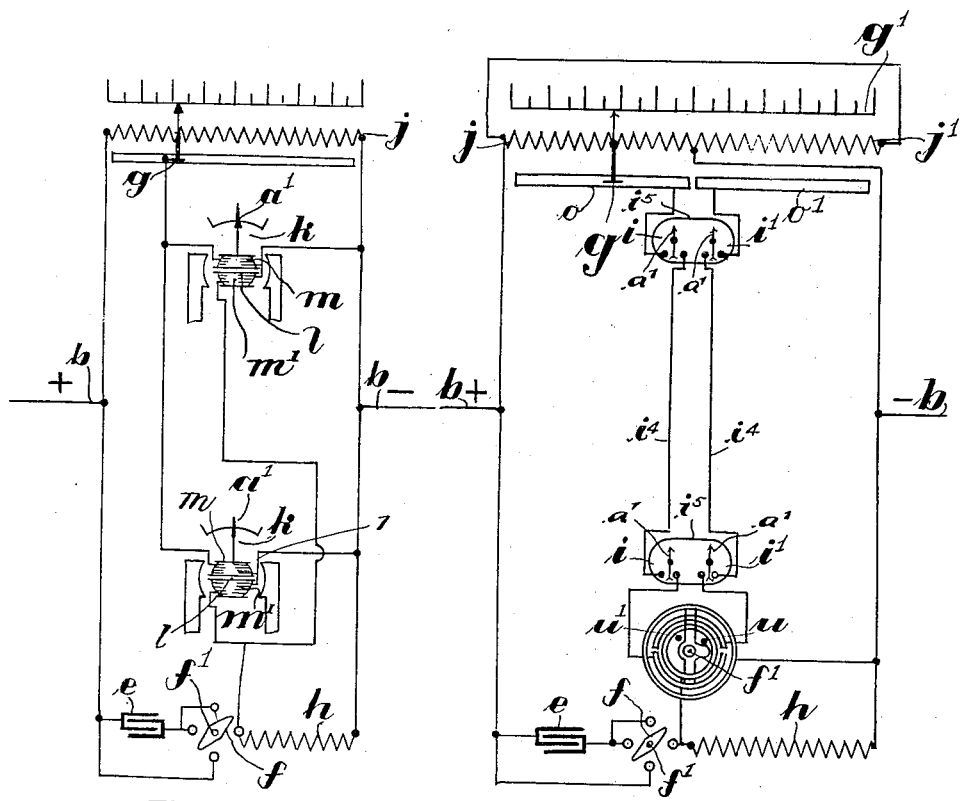
Fig. 5 illustrates diagrammatically an alternative arrangement to those shown in Figs. 2 and 3, involving indicators with moving coils having duplex windings.
Fig. 6 illustrates diagrammatically another arrangement involving means whereby direction of rotation is indicated.

Fig. 5 diagrammatically illustrates an arrangement in which the simple current indicator $i\ i'$ is replaced by an indicator or indicators of the differential type. Each of such indicators $k\ k$ has moving coils $l$ each of said coils $l$ having two windings $m$ and $m'$, one of the windings $m$ is connected to the variable resistance $j$ at the transmitting end in such a manner that the current flowing in the coil $m$ depends on the position of the contactor $m$, while the other winding $m'$ is connected to the junction between the interrupter $f$ and a resistance $h$ in series with it, the current flowing through the coil $m'$ thus depending on the speed of the interrupter $f$. The two windings $m\ m'$ of each indicator $k$ are connected so that the effect of the current flowing in one winding opposes the effect of the current flowing in the other winding, and the pointer $a'$ of the instrument will consequently indicate zero or balance when the ampere turns of the two windings $m$ and $m'$ are equal.

In all the arrangements so far illustrated and described the direction of rotation of the interrupter does not influence the operation of the indicating arrangements or control.

To obtain an indication of direction as well as an indication of speed the arrangement diagrammatically illustrated in Fig. 6 may be used. In this arrangement two resistances $j\ j'$ are arranged in parallel with the source of electrical energy and are so disposed that a contactor $g$ can be moved over either of them to connect points on them to either or both of two connecting bars $o\ o'$ which are connected respectively to pairs of indicators $i\ i'$ conveniently arranged as duplex instruments $i^5$ in the manner indicated. One resistance $j$, one bar $o$ and one indicator $i$ of each of the duplex indicators deal with one direction of rotation, while the other resistance $j'$, bar $o'$ and indicator $i^5$ of the duplex indicators deal with the other direction of rotation.

The duplex indicators $i^5$ are connected by means of slip rings $p\ p\ p\ p$ (Fig. 7) to a device rotating with the shaft $f'$, the speed of which is to be indicated, a commutator $q$ and contacting brushes $r\ r$ also being mounted on the same device and adapted by their relative movement when the direction of rotation is reversed to effect changes in the connections between the duplex indicators $i^5$, the interrupter $f$ and the source of electric supply $b\ b$.

Figure 7:
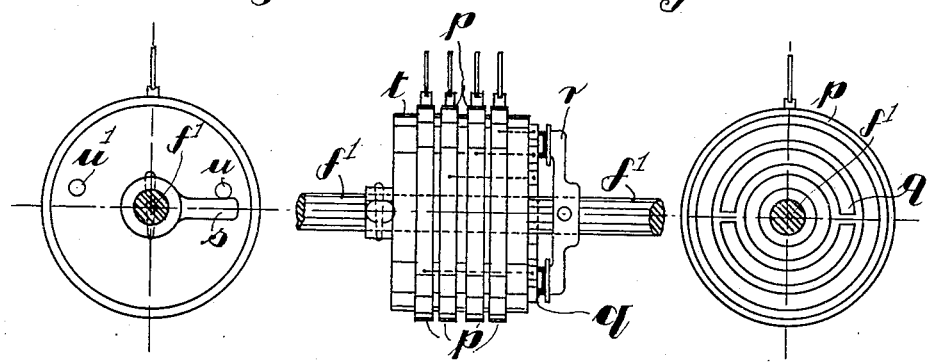
Fig. 7 is an enlarged view of the commutating device included in Fig. 6.

Referring to Fig. 7 which is an enlarged view of the commutating device it will be seen that the brushes $r\ r$ which interact with the commutator $q$ to change the connections and the driving arm $s$ are rigidly fixed to the shaft $f'$ moved by and in the same direction as the interrupter $f$. The commutator support $t$ is rotated by the shaft $f'$ through the driving arm $s$ which engages with one of the pins $u$ $u'$, said pins $u$ and $u'$ being so arranged that when the shaft $f'$ is rotating in one direction the driving arm $s$ will engage the stop $u$ and when the shaft $f'$ is rotating in the other direction the arm $s$ will engage the stop $u'$ after passing through half a revolution of lost motion. The change over of the electrical connections is effected by this half revolution, and the connections are made so that it is impossible for all the indicators to be balanced unless the shaft $f'$ is running at the correct speed (including zero speed) and in the correct direction.

Figure 8:
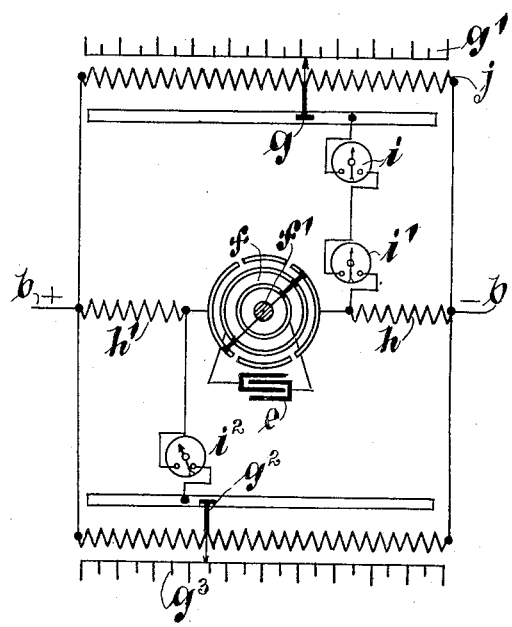
Fig. 8 illustrates diagrammatically a modified arrangement of parts by which the condenser can be alternately charged in opposite directions and further in which an independent indication can be obtained without disturbing the normal working circuit.

A further modification is illustrated in Fig. 8 in which the condenser $e$ of constant capacity is alternately charged, discharged, recharged in opposite direction and discharged, the interrupter $f$ being so arranged as to enable this sequence to be carried out with a source of direct current which is supplied through the mains $b$ $b$. This arrangement has a further advantage above those already described inasmuch as it is possible by including another indicator $i^2$, resistance $h'$, contactor $g^2$ and scale $g^3$ to enable a third person to ascertain at any moment what is the speed of rotation of the interrupter $f$ without disturbing the normal working circuit.

In any of the arrangements involving the employment of the principle of the Wheatstone bridge as hereinbefore described and illustrated, by substituting a relay for the indicator $i$ automatic control of speed can be effected. Referring to Fig. 9 a relay $i^3$ is arranged in the mid wire $i^4$, the moving part $i^6$ of the relay $i^3$ having contacts $i^7$ and $i^8$ adapted to make contact with these fixed contacts $i^9$ and $i^{10}$ respectively. The contacts $i^7$, $i^8$, $i^9$ and $i^{10}$ are located in the circuit of the motor $k^2$ so that upon cooperation of the contacts $i^7$ and $i^9$ or $i^8$ and $i^{10}$ the motor $k'$ will be supplied with current and will rotate the apparatus connected therewith.

Further the arrangements described may be modified to enable them to be employed as a signalling device for any kind of orders. In Fig. 10 the interrupter $f$ acts as a transmitter, the order transmitted being made to depend upon the speed of the interrupter $f$ which is rotated by a small motor $k^3$, the speed of which can be regulated by the variable resistance R. The motor $k^3$ is connected to a speed indicator $k^4$ the scale of which is engraved with the required orders, each of which correspond to a certain speed of the interrupter. With such an arrangement the scale at the receiving end which would normally represent speeds will have orders engraved thereon corresponding to the orders engraved on the scale of the speed indicator $k^4$.

This invention is not limited to the use of the charging current of the condenser; as obviously the discharge current may be utilized, neither do I limit myself to the use of one condenser or one charge and discharge of the condensers per revolution of the interrupting device. Further, although the invention has been described as applied to rotary motion, it can be equally well applied to rectilinear motion as illustrated in Fig. 11 by arranging the contacts of the interrupter $f$ as shown.

The combination of a condenser of constant capacity and an interrupter acts within certain limits exactly as if it were a resistance, in that the quantity of electricity passing through the circuit per second is determined by the number of revolutions of the interrupter just as it would be by the amount of a resistance. The difference is that in the case of the resistance the flow is continuous, while in the case of the condenser and interrupter the flow is discontinuous. There is therefore an inferior limit of speed at which the discontinuity of the current will begin to affect the steadiness of the deflection obtained; but this limit can be indefinitely reduced by gearing up the interrupter mechanically or by increasing the number of interruptions per revolution.

I claim:

Electrical transmission system by which the speed of a moving body can be readily ascertained from a distance, comprising a potentiometer at one station; a condenser of constant capacity, a switch operated by the moving body for alternately connecting the condenser with a source of electrical energy to charge said condenser and short circuiting the condenser to discharge said condenser, and a noninductive resistance at the other station; a source of electrical energy and a polarized indicating device responsive to nonalternating electrical energy being operatively associated with the potentiometer, condenser, switch and resistance to enable the apparent resistance of the condenser and switch to be measured.

In testimony whereof I have signed my name to this specification.

Dated this third day of May 1920.

JOHN CUTHBERT NEEDHAM.